(12) United States Patent
Zhao et al.

(10) Patent No.: US 9,832,083 B2
(45) Date of Patent: Nov. 28, 2017

(54) APPARATUS AND METHOD FOR DETECTING CHANNEL SPACING AND SYSTEM

(71) Applicant: FUJITSU LIMITED, Kawasaki (JP)

(72) Inventors: Ying Zhao, Beijing (CN); Liang Dou, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/288,123

(22) Filed: Oct. 7, 2016

(65) Prior Publication Data

US 2017/0104643 A1 Apr. 13, 2017

(30) Foreign Application Priority Data

Oct. 10, 2015 (CN) .......................... 2015 1 0651905

(51) Int. Cl.
*H04L 12/26* (2006.01)
*H04L 7/00* (2006.01)
*H04B 10/00* (2013.01)
*H04B 10/079* (2013.01)

(52) U.S. Cl.
CPC .......... *H04L 43/028* (2013.01); *H04B 10/00* (2013.01); *H04B 10/07957* (2013.01); *H04L 7/0087* (2013.01)

(58) Field of Classification Search
CPC .......... H04B 10/0779; H04B 10/07957; H04B 10/0799; H04B 2210/074; H04J 14/0256
See application file for complete search history.

(56) References Cited

U.S. PATENT DOCUMENTS

| | | | |
|---|---|---|---|
| 2003/0123066 A1 | 7/2003 | Park | |
| 2003/0223470 A1 | 12/2003 | Ackerman et al. | |
| 2009/0136230 A1 | 5/2009 | Bouda | |
| 2009/0232493 A1 | 9/2009 | Tu | |
| 2009/0251684 A1 | 10/2009 | Arai et al. | |
| 2011/0135301 A1* | 6/2011 | Myslinski | H04B 10/572 398/34 |
| 2013/0058650 A1* | 3/2013 | Bouda | H04J 14/0212 398/48 |

* cited by examiner

*Primary Examiner* — David S Huang
(74) *Attorney, Agent, or Firm* — Staas & Halsey LLP

(57) ABSTRACT

Embodiments of the present disclosure provide an apparatus and method for detecting channel spacing and a system. The apparatus for detecting channel spacing includes a first estimating unit configured to estimate a frequency offset of a center channel according to a received signal, a second estimating unit configured to estimate a frequency offset of a neighboring channel according to the received signal, and a determining unit configured to determine channel spacing according to the frequency offset of the center channel estimated by the first estimating unit and the frequency offset of the neighboring channel estimated by the second estimating unit. With the embodiments of the present disclosure, estimation accuracy of channel spacing may be ensured, and influence of non-ideal factors on estimation value may be reduced.

10 Claims, 5 Drawing Sheets

APPARATUS AND METHOD FOR DETECTING CHANNEL SPACING AND SYSTEM

CROSS-REFERENCE TO RELATED APPLICATIONS

This application claims the priority benefit of Chinese Patent Application No. 201510651905.X filed on Oct. 10, 2015 in the Chinese State Intellectual Property Office, the disclosure of which is incorporated herein in its entirety by reference.

BACKGROUND

1. Field

The present disclosure relates to the field of communications, and in particular to an apparatus and method for detecting channel spacing and a system.

2. Description of the Related Art

In a multicarrier optical communication system, subcarrier data are modulated in several optical carriers independent of each other. Under an ideal condition, wavelengths of lasers are stable, and spacing of the carriers are fixed. In a practical system, as the wavelengths of the lasers are influenced by such factors as a change of a driving current, fluctuation of temperatures, and resonator aging, outputted wavelengths will drift in a certain range. Such uncertain changes of the wavelengths will bring relatively large influence to the multicarrier optical communications system, which are mainly embodied as: 1) neighboring channel crosstalk occurs between subcarrier channels; and 2) edge subcarriers are subjected to more severe distortion.

An efficient channel spacing monitoring method is important means for overcoming laser wavelength drifting. On a basis of performing channel spacing monitoring, feedback adjustment may be performed on the wavelengths of the lasers, so as to avoid large changes of the wavelengths, thereby achieving locking of the channel wavelengths. Stable channel wavelengths may not only avoid neighboring channel crosstalk, but also make spectral resources to be utilized efficiently, thereby increasing spectral utilization.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

Additional aspects and/or advantages will be set forth in part in the description which follows and, in part, will be apparent from the description, or may be learned by practice of the invention.

It was found by the inventor in the implementation of the present disclosure that the channel spacing monitoring is a basis for achieving channel wavelength locking, and is also efficient means for further optimizing a multichannel optical communications system. During performing the wavelength monitoring, it is not expected to introduce extra hardware overhead, hence, attention is paid to a wavelength monitoring scheme based on digital signal processing performed in a receiver.

Embodiments of the present disclosure provide an apparatus and method for detecting channel spacing and a system, in which information on channel spacing is obtained based on performing signal processing in an optical receiver without introducing extra large complexity.

According to a first aspect of the embodiments of the present disclosure, there is provided an apparatus for detecting channel spacing. The apparatus includes a first estimating unit configured to estimate a frequency offset of a center channel according to a received signal, a second estimating unit configured to estimate a frequency offset of a neighboring channel according to the received signal, and a determining unit configured to determine channel spacing according to the frequency offset of the center channel estimated by the first estimating unit and the frequency offset of the neighboring channel estimated by the second estimating unit.

According to a second aspect of the embodiments of the present disclosure, there is provided a method for detecting channel spacing. The method includes estimating a frequency offset of a center channel according to a received signal, estimating a frequency offset of a neighboring channel according to the received signal, and determining channel spacing according to the estimated frequency offset of the center channel and the estimated frequency offset of the neighboring channel.

According to a third aspect of the embodiments of the present disclosure, there is provided a multichannel optical receiver, including the apparatus for detecting channel spacing described in the first aspect.

According to a fourth aspect of the embodiments of the present disclosure, there is provided a multichannel optical communications system, including a transmitter and the optical receiver described in the third aspect.

An advantage of the embodiments of the present disclosure exists in that with the embodiments of the present disclosure, estimation accuracy of channel spacing may be ensured, and influence of non-ideal factors on estimation performance may be reduced.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure only, and a person of ordinary skill in the art may obtain other accompanying drawings according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims. Various embodiments of the present disclosure shall be described below with reference to the accompanying drawings.

Embodiments of the present disclosure provide an apparatus and method for detecting channel spacing and a system, in which information on the optical receiver is used to perform frequency offset estimation on a center channel and a neighboring channel in the receiver, so as to achieve judgment of the channel spacing. Furthermore, necessary processing may be performed on the information on the receiver, so as to improve a detection accuracy of the channel spacing. A core content of the embodiments of the present disclosure is to use an existing or newly-proposed frequency offset estimation method to perform channel spacing detection. Efficient receiver data processing not only is a basis for achieving a function of channel spacing detection, but also facilitates further improving a detection accuracy, thereby providing instructions for production of channel control modules.

The embodiments of the present disclosure shall be described below with reference to the accompanying drawings and particular implementations.

Embodiment 1

Figure 1:
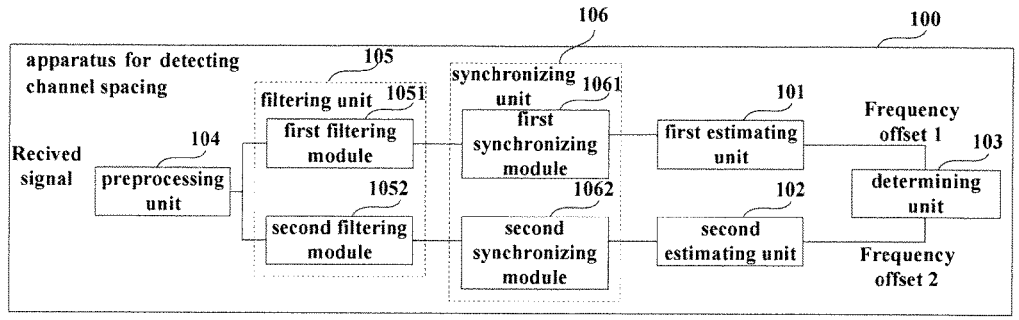
FIG. 1 is a schematic diagram of a structure of the apparatus for detecting channel spacing of an embodiment of the present disclosure.

An embodiment of the present disclosure provides an apparatus for detecting channel spacing, applicable to an optical receiver of a multichannel optical communications system. FIG. 1 is a schematic diagram of a structure of the apparatus. Referring to FIG. 1, the apparatus 100 includes: a first estimating unit 101, a second estimating unit 102 and a determining unit 103. In this embodiment, the first estimating unit 101 is configured to estimate a frequency offset of a center channel according to a received signal, the second estimating unit 102 is configured to estimate a frequency offset of a neighboring channel according to the received signal, and the determining unit 103 is configured to determine channel spacing according to the frequency offset of the center channel estimated by the first estimating unit 101 and the frequency offset of the neighboring channel estimated by the second estimating unit 102.

Figure 2:
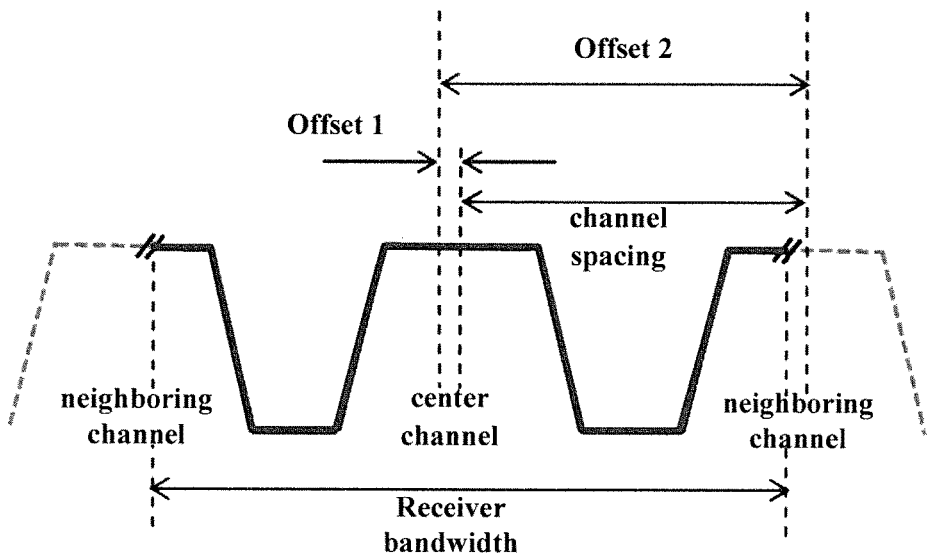
FIG. 2 is a schematic diagram of principles of estimation of channel spacing.

FIG. 2 is a schematic diagram of principles the apparatus for detecting channel spacing of this embodiment. As shown in FIG. 2, within a bandwidth range of an optical receiver, in addition to a center channel needing to be demodulated, information on left and right neighboring channels received simultaneously is further included. As the bandwidth of the optical receiver is limited, the information on left and right neighboring channels is only partially received, which is reflected by a range shown by broadened solid lines in FIG. 2. Within this range, as spectra of the neighboring channels are incomplete, spacing between central wavelengths of two channels cannot be judged directly. In this embodiment, a method for measuring frequency offsets of the center channel and a neighboring channel is employed to indirectly measure the channel spacing.

As shown in FIG. 2, a frequency offset is defined as a difference between a central frequency and a zero frequency of a channel. In this embodiment, the first estimating unit 101 and the second estimating unit 102 respectively estimate the frequency offset of the center channel (i.e. frequency offset 1 in FIG. 2) and the frequency offset of the neighboring channel (i.e. frequency offset 2 in FIG. 2), hence the determining unit 103 obtains the channel spacing based on the difference between frequency offset 2 and frequency offset 1.

In this embodiment, frequency offset estimation methods used by the first estimating unit 101 and the second estimating unit 102 are not limited, and existing frequency offset estimation methods may be applicable to this embodiment. And the first estimating unit 101 and the second estimating unit 102 may use identical or different frequency offset estimation methods.

In an implementation, the first estimating unit 101 and the second estimating unit 102 may estimate respective frequency offsets of the center channel and the neighboring channel according to formula (1) below:

$$\Delta f = \text{angle}(<S_n \cdot S_{n+k}^*>)/2\pi k T_s \quad (1);$$

where, $S_n$ is complex information of an n-th sampling point, $S_{n+k}^*$ is complex conjugate information of an (n+k)-th sampling point, and $T_s$ is a sampling period.

In this implementation, the frequency offset estimation is to find a relation of a change of a phase offset of a sampling sequence along with the time. For example, a receiving sampling sequence is denoted as:

$$S_n = \tilde{S}(nT_s) \cdot \exp(j2\pi \Delta f n T_s + \phi) + N(nT_s);$$

where, $\tilde{S}(nT_S)$ is a signal sequence taking no frequency offset and phase noise into account, $\Delta f$ is a frequency offset, ϕ is a phase noise (deemed as being of a fixed value in a certain period of time), and N(nT$_S$) is a sampling point noise.

In order to eliminate the influence of the phase noise and the sampling point noise, the following formula is taken as an estimated metric in a frequency offset estimation method:

$$<S_n \cdot S_{n+k}{}^*> = <\tilde{S}(nT_S) \cdot \tilde{S}((n+k)T_S)> \exp(j2\pi \Delta f T_S);$$

where, <·> denotes calculating an average value, and (·)* denotes complex conjugate.

Thus, the frequency offset Δf may be expressed by formula (1).

In another implementation, the first estimating unit 101 and the second estimating unit 102 may estimate respective frequency offsets of the center channel and the neighboring channel according to formula (2) below:

$$\Delta f = \text{angle}(<S_n \cdot S_{n+N}{}^*>)/2\pi N T_S \quad (2);$$

where, $S_n$ is complex information of an n-th symbol of a periodic signal or a periodic training sequence, $S_{n+N}{}^*$ is complex conjugate information of an (n+N)-th symbol, $T_s$ is a symbol period, and N is the number of symbols of each period.

In this implementation, it is assumed that the training sequence $\tilde{S}(nT_S)$ used for estimating the frequency offset is a periodic sequence of a period of N symbols, and N symbols of each period are random sequences or CAZAC (constant amplitude zero auto-correlation) sequences, that is, $\tilde{S}(nT_S) = \tilde{S}(n+N)T_S$]. Taking the frequency offsets and the noises into account, a sampling sequence of a received signal is expressed as:

$$S_n = \tilde{S}(nT_S) \cdot \exp(j2\pi \Delta f n T_S + \phi) + N(nT_S);$$

where, $\tilde{S}(nT_S)$ is a signal sequence taking no frequency offset and phase noise into account, Δf is a frequency offset, ϕ is a phase noise (deemed as being of a fixed value in a certain period of time), and N(nT$_S$) is a sampling point noise.

In order to eliminate the influence of the phase noise and the sampling point noise, the following formula is taken as an estimated metric in a frequency offset estimation method:

$$\langle S_n \cdot S_{n+N}^* \rangle_N = \langle \tilde{S}(nT_S) \cdot \tilde{S}^*((n+k)T_S) \rangle_N \exp(j2\pi \Delta f T_S);$$

$$= \langle |\tilde{S}(nT_S)|^2 \rangle_N \exp(j2\pi N \Delta f T_S)$$

where, <·> denotes calculating an average value, and (·)* denotes complex conjugate.

Thus, the frequency offset Δf may be expressed by formula (2).

The above two implementations of frequency offset estimation are illustrative only, and as described above, this embodiment is not limited thereto.

In this embodiment, the received signal is a signal received from the optical receiver, and as a receiving bandwidth of the optical receiver is limited, the received signal in spectrum includes a complete channel signal (a signal of the center channel) and two incomplete signals (signals of the left and right neighboring channels). On the one hand, the optical receiver normally processes the received signal, such as photoelectric conversion, digital-to-analog conversion, demodulation and decoding, etc. And on the other hand, the optical receiver estimates the channel spacing by using the apparatus for detecting channel spacing of this embodiment according to the received signal.

In an implementation of this embodiment, in order to ensure the frequency offset estimation accuracy, reduce influence of non-ideal factor on estimation value, so as to facilitate subsequent frequency offset estimation, the received signal may be preprocessed before estimating the frequency offsets of the center channel and the neighboring channel. In this implementation, the apparatus 100 for detecting channel spacing may further include a preprocessing unit 104. As shown in FIG. 1, the preprocessing unit 104 is configured to preprocess the received signal, so that the first estimating unit 101 and the second estimating unit 102 estimate the frequency offset of the center channel and the frequency offset of the neighboring channel according to the preprocessed received signal.

In this implementation, the preprocessing of the receive signal may be, for example, processing of noise suppression (IQ imbalance elimination), polarization demultiplexing, and pre-equalization, etc; however, this embodiment is not limited thereto. Two implementations of the preprocessing unit 104 are provided below.

Figure 3:
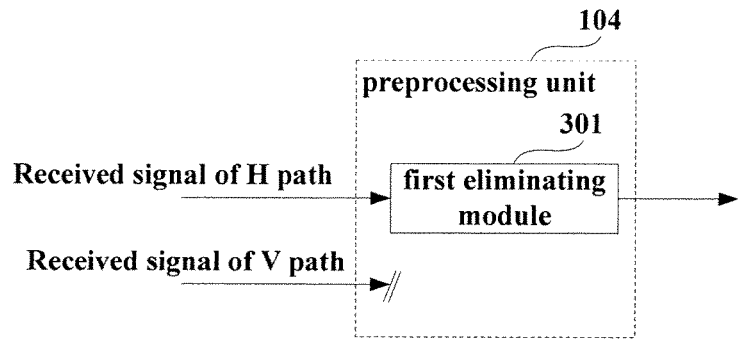
FIG. 3 is a schematic diagram of operational principles of an implementation of a preprocessing unit.

FIG. 3 is a schematic diagram of an implementation of the preprocessing unit 104. In this implementation, the preprocessing unit 104 includes a first eliminating module 301 configured to perform IQ imbalance elimination on one path of signal of the received signal, so as to obtain a preprocessed received signal. As shown in FIG. 3, the received signal includes H path and V path signals. As frequency offset estimation needs to be performed only on one path of signal, in this implementation, one of the H path and V path signals is discarded, and the other path of signal is reserved and performed IQ imbalance elimination, which is taken as output of the preprocessing unit 104.

Figure 4:
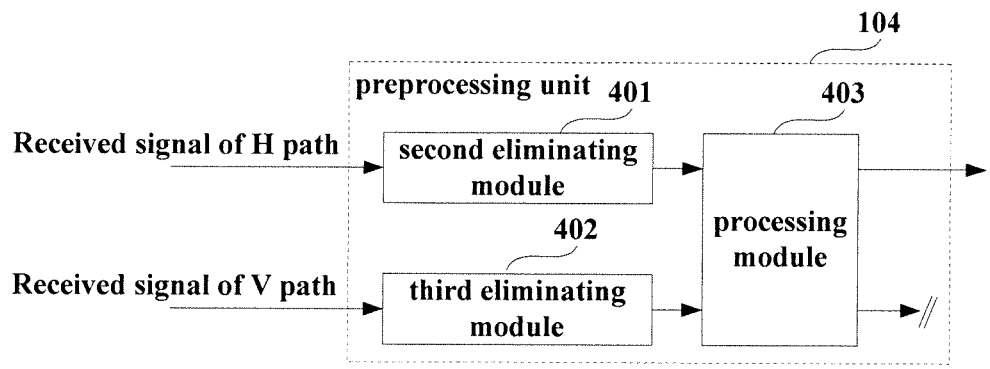
FIG. 4 is a schematic diagram of operational principles of another implementation of the preprocessing unit.

FIG. 4 is a schematic diagram of another implementation of the preprocessing unit 104. In this implementation, the preprocessing unit 104 includes a second eliminating module 401, a third eliminating module 402 and a processing module 403. The second eliminating module 401 performs IQ imbalance elimination on one path signal of the received signal, the third eliminating module 402 performs IQ imbalance elimination on the other path signal of the received signal, and the processing module 403 performs polarization demultiplexing and/or pre-equalization on the two paths of signals processed by the second eliminating module 401 and the third eliminating module 402, selects one path of the processed signals, and takes it as the preprocessed received signal. As shown in FIG. 4, the received signal includes H path and V path signals. In the optical receiver, IQ imbalance elimination, polarization demultiplexing and pre-equalization may be performed in succession, then one of the H path and V path signals is discarded, and the other path of signal is reserved and taken as output of the preprocessing unit 104.

The above two implementations of preprocessing are illustrative only, and other methods for preprocessing a received signal may also be applicable to this embodiment.

In another implementation of this embodiment, in order to eliminate influence of other channels and ensure accuracy and frequency offset estimation accuracy of the center channel and the neighboring channel, a necessary filtering operation may be performed on the received signal before estimating the frequency offsets of the center channel and the neighboring channel. In this implementation, the apparatus 100 for detecting channel spacing may further include a filtering unit 105. As shown in FIG. 1, the filtering unit 105 is configured to filter the received signal, so that the first estimating unit 101 and the second estimating unit 102 estimate the frequency offset of the center channel and the frequency offset of the neighboring channel according to the filtered received signal.

In this implementation, in order to estimate the frequency offsets of the center channel and the neighboring channel respectively, different filtering processing may be performed on the center channel and the neighboring channel, so as to ensure in principle that an outputted signal of the filtering operation contains only interested information on channels as possible, thereby eliminating other channel crosstalk to a maximum extent.

As shown in FIG. 1, in this implementation, the filtering unit 105 may include a first filtering module 1051 and a second filtering module 1052. The first filtering module 1051 is configured to set a filter bandwidth of the center channel, filter the received signal according to the filter bandwidth of the center channel, and provide the filtered signal to the first estimating unit 101; and the second filtering module 1052 is configured to set filter bandwidths of the neighboring channel, filter the received signal according to the filter bandwidth of the neighboring channel, and provide the filtered signal to the second estimating unit 102.

Figure 5:
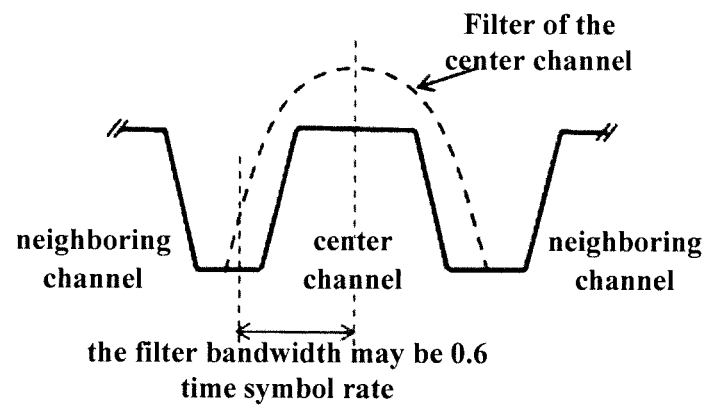
FIG. 5 is a schematic diagram of principles of setting a filter bandwidth of a center channel.

FIG. 5 is a schematic diagram of a setting a filter bandwidth of the center channel. As shown in FIG. 5, a particular numeral value of the filter bandwidth of the center channel may be determined by a spectral width of the center channel, and a roll-off factor, etc. In this implementation, the filter bandwidth of the center channel may be 0.6 time symbol rate (a Baud rate) of a single-side bandwidth as an example.

Figure 6:
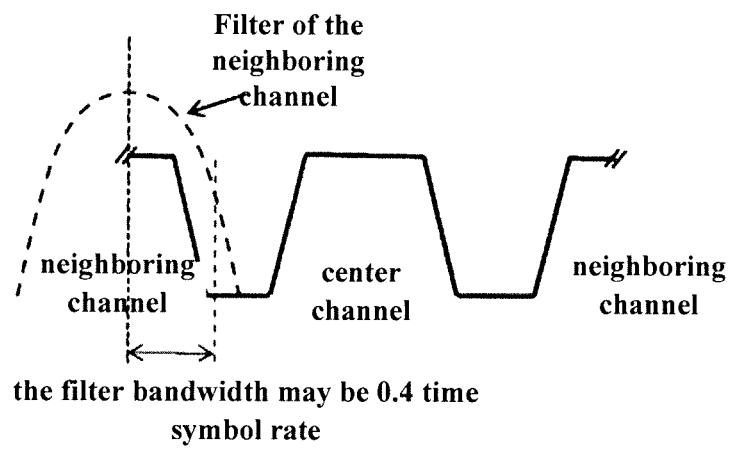
FIG. 6 is a schematic diagram of principles of setting a filter bandwidth of a neighboring channel.

FIG. 6 is a schematic diagram of setting a filter bandwidth of a neighboring channel. As shown in FIG. 6, principle of setting the filter bandwidth of the neighboring channel is: ensuring that information on the neighboring channel is maintained and information on the center channel is removed in a case where the channel spacing or the frequency offset change. In this implementation, the filter bandwidth of the neighboring channel may be 0.4 time symbol rate (a Baud rate).

Figure 7:
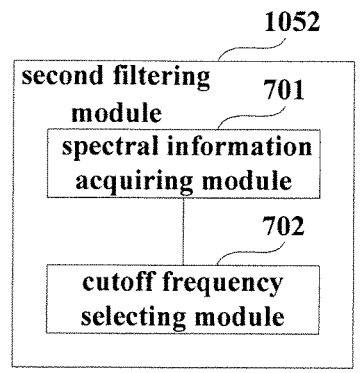
FIG. 7 is a schematic diagram of a structure of an implementation of a second filtering module.

In an implementation of the second filtering module 1052, as shown in FIG. 7, the second filtering module 1052 includes a spectral information acquiring module 701 and a cutoff frequency selecting module 702. The spectral information acquiring module 701 is configured to perform fast Fourier transformation (FFT) on the received signal, and perform a smoothening operation on a power spectrum, and the cutoff frequency selecting module 702 is configured to select a cutoff frequency of high-pass filter of the neighboring channel.

Figure 8:
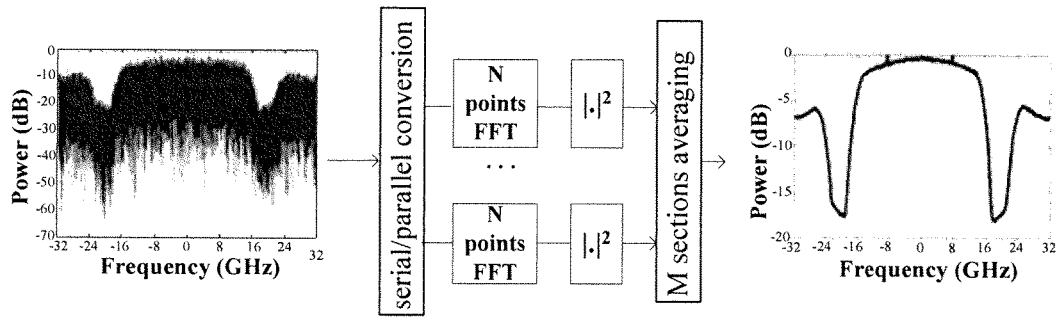
FIG. 8 is a schematic diagram of principles of a spectral information acquiring module.

FIG. 8 is a schematic diagram of operational principles of the spectral information acquiring module 701. As shown in FIG. 8, the received signal is a sampling sequence of MxN points extracted from the receiver. Its spectrum is as shown in the left part in FIG. 8, which reflects a channel shape; however, as randomness of a data signal, the spectrum fluctuates to a large extent. As the measurement of the channel spacing needs only envelope information of the spectrum, the random data information of the spectrum may be removed. In the spectral information acquiring module 701, influence of the random data may be eliminated by using an average method. First, the sampling sequence of MxN points may be converted into subsequences of M sections via serial/parallel conversion, each section having N points, each section of subsequences is performed fast Fourier transformation, so as to calculate its spectrum. Then, modulo square of each section of spectrum is calculated, so as to reflect a power spectrum shape in a frequency domain. Finally, an average power spectrum is calculated by using the M sections of power spectra. In this way, the random information on each section of spectrum may be efficiently suppressed after calculation of the average, an outputted smooth power spectrum being as shown in the right part in FIG. 8.

Figure 9:
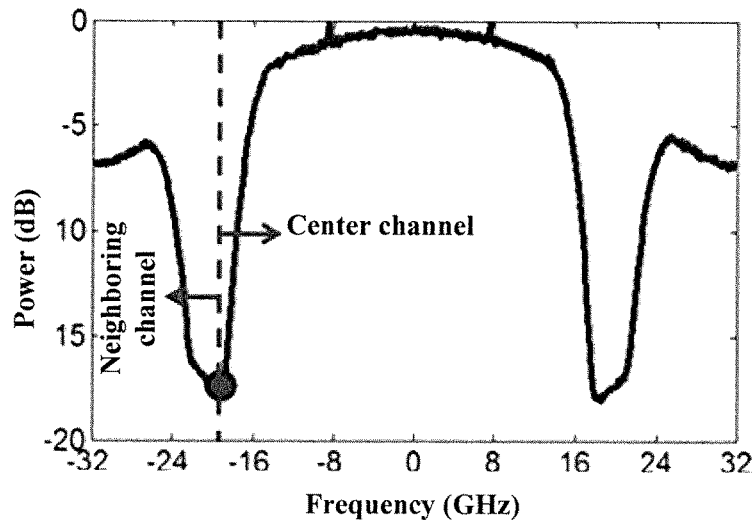
FIG. 9 is a schematic diagram of principles of a cutoff frequency selecting module.

FIG. 9 is a schematic diagram of principles of the cutoff frequency selecting module 702. As shown in FIG. 9, based on the result outputted by the spectral information acquiring module 701, a lowest point of the power spectrum may be searched at the left half of the spectrum shown in FIG. 9, and the lowest point is taken as a differential point of the center channel and the neighboring channel, the left parts to this point being identified as the neighboring channel, and the right part being identified as the center channel. Thus, the high-pass filter may be set according to a frequency of this point, so as to select the neighboring channel.

The above implementation of the filtering operation is illustrative only, and other methods for performing a filtering operation on the received signal are also applicable to this embodiment.

In another implementation of this embodiment, in order to obtain a feature of the above received signal, a synchronization operation may be performed on the received signal before estimating the frequency offsets of the center channel and the neighboring channel. In this implementation, the apparatus 100 for detecting channel spacing may further include a synchronizing unit 106. As shown in FIG. 1, the synchronizing unit 106 is configured to perform synchronization operations on the received signal, so that the first estimating unit 101 and the second estimating unit 102 estimate the frequency offset of the center channel and the frequency offset of the neighboring channel according to the synchronized received signal.

In this implementation, in order to respectively estimate the frequency offset of the center channel and the frequency offset of the neighboring channel, different synchronization operations may be performed on the center channel and the neighboring channel. As shown in FIG. 1, in this implementation, the synchronizing unit 106 may include a first synchronizing module 1061 and a second synchronizing module 1062. The first synchronizing module 1061 is configured to perform a first synchronization operation on the received signal and provide a synchronization result to the first estimating unit 101, so that the first estimating unit 101 estimates the frequency offset of the center channel according to the synchronized received signal. And the second synchronizing module 1062 is configured to perform a second synchronization operation on the received signal and provide a synchronization result to the second estimating unit 102, so that the second estimating unit 102 estimates the frequency offset of the neighboring channel according to the synchronized received signal.

In this implementation, synchronization methods employed by the first synchronizing module 1061 and the second synchronizing module 1062 are not limited, and all the currently existing synchronization methods may be applicable to this embodiment. And the first synchronizing module 1061 and the second synchronizing module 1062 may use identical or different synchronization methods.

In an implementation, the synchronization operation may be: calculating a correlation value of former $N_f$ sampling values and latter $N_f$ sampling values of n sections of sampling values of lengths of 2 $N_f$ at each polarization state starting from each sampling point according to length $N_f$ of a training sequence and lengths of cyclic prefix and cyclic postfix set before and after the training sequence; calculating a square of a modulus of the correlation value; performing weighted averaging on predetermined sampling point sequence numbers by using the squares of moduli of the correlation values at two polarization states, so as to obtain a starting position of the training sequence; and determining a position of the training sequence in the received signal according to the starting position and a length of the training sequence. As the above method and the above training sequence are used for the synchronization, the synchronization accuracy is improved.

In this embodiment, it is taken as an example that the apparatus for detecting channel spacing is applicable to the optical receiver of the multicarrier optical communications system to estimate the channel spacing of the subcarriers. However, this embodiment is not limited to a multicarrier optical communications system only, and other systems or apparatuses related to estimation of channel spacing may also employ the apparatus for detecting channel spacing of this embodiment.

With the apparatus for detecting channel spacing of this embodiment, estimation accuracy of channel spacing may be ensured, and influence of non-ideal factors on estimation value may be reduced.

Embodiment 2

An embodiment of the present disclosure provides a method for detecting channel spacing, applicable to an optical receiver of a multichannel optical communications system. As principles of the method for solving problems are similar to that of the apparatus in Embodiment 1, the implementation of the apparatus in Embodiment 1 may be referred to for implementation of the method, with identical contents being not going to be described herein any further.

Figure 10:
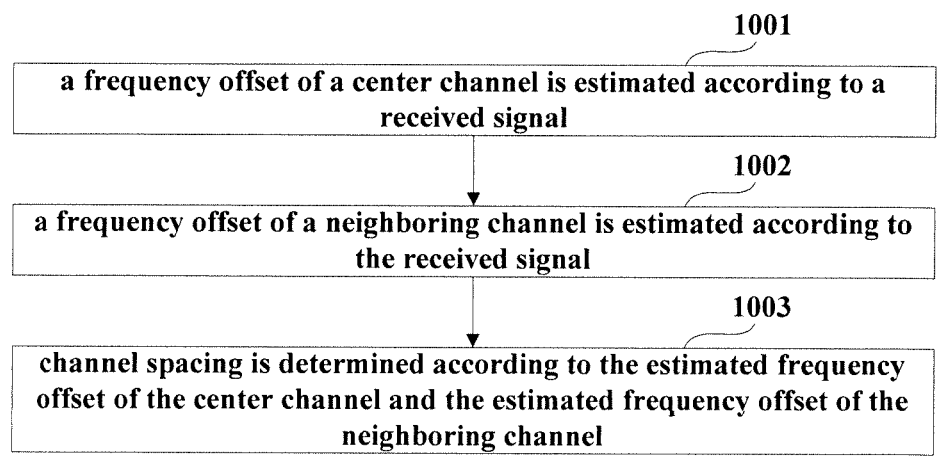
FIG. 10 is a flowchart of the method for detecting channel spacing of an embodiment of the present disclosure.

FIG. 10 is a flowchart of the method for detecting channel spacing of this embodiment. Referring to FIG. 10, the method includes:

step 1001: a frequency offset of a center channel is estimated according to a received signal;

step 1002: a frequency offset of a neighboring channel is estimated according to the received signal; and step 1003: channel spacing is determined according to the estimated frequency offset of the center channel and the estimated frequency offset of the neighboring channel.

In an implementation, the method may further include: preprocessing the received signal, so as to estimate the frequency offset of the center channel and the frequency offset of the neighboring channel according to the preprocessed received signal. The preprocessing method is not limited in this embodiment, and any existing preprocessing methods may be applicable to this implementation.

In an implementation, the method may further include: filtering the received signal, so as to estimate the frequency offset of the center channel and the frequency offset of the neighboring channel according to the filtered received signal.

In this implementation, the filtering the received signal may include: setting a filter bandwidth of the center channel, filtering the received signal according to the filter bandwidth of the center channel, so as to obtain a filtered signal, so as to estimate the frequency offset of the center channel according to the filtered signal. And the filtering the received signal may further include: setting filter bandwidth of the neighboring channel, filtering the received signal according to the filter bandwidth of the neighboring channel, so as to obtain a filtered signal, so as to estimate the frequency offset of the neighboring channel according to the filtered signal. The filtering operation is not limited in this embodiment, and identical or different filtering methods may be used for the center channel and the neighboring channel. And any existing filtering methods may be applicable to this implementation.

In this implementation, the filter bandwidth of the center channel may be determined by a spectral width of the center channel and a roll-off factor. And the filter bandwidth of the neighboring channel may ensure that information on the neighboring channel is maintained and information on the center channel is removed in a case where the channel spacing or the frequency offset change.

In an implementation, the method may further include: performing synchronization operations on the received signal, so as to estimate the frequency offset of the center channel and the frequency offset of the neighboring channel according to the synchronized received signal.

In this implementation, a first synchronization operation may be performed on the received signal, so as to estimate the frequency offset of the center channel according to the synchronized received signal, and a second synchronization operation may be performed on the received signal, so as to estimate the frequency offset of the neighboring channel according to the synchronized received signal. The first synchronization operation and the second synchronization operation are not limited in this embodiment. The first synchronization operation and the second synchronization operation may use identical or different synchronization methods, and any existing synchronization methods may be applicable to this implementation.

In this embodiment, the above preprocessing, filtering operation and synchronization operation are all performed before the estimation of the frequency offsets. And before performing the estimation of the frequency offsets, any of the preprocessing, filtering operation and synchronization or a combination thereof may be performed, and in addition to the above preprocessing, filtering operation and synchronization, other necessary processing may be performed in the received signal, which shall not be described herein any further.

In this embodiment, the frequency offset of the center channel may be estimated according to formula (1) or formula (2); and likewise, the frequency offset of the neighboring channel may also be estimated according to formula (1) or formula (2) as described above, which shall not be described herein any further.

With the method of this embodiment, estimation accuracy of channel spacing may be ensured, and influence of non-ideal factors on estimation value may be reduced.

Embodiment 3

An embodiment of the present disclosure provides a multichannel optical receiver, including the apparatus for detecting channel spacing described in Embodiment 1.

Figure 11:
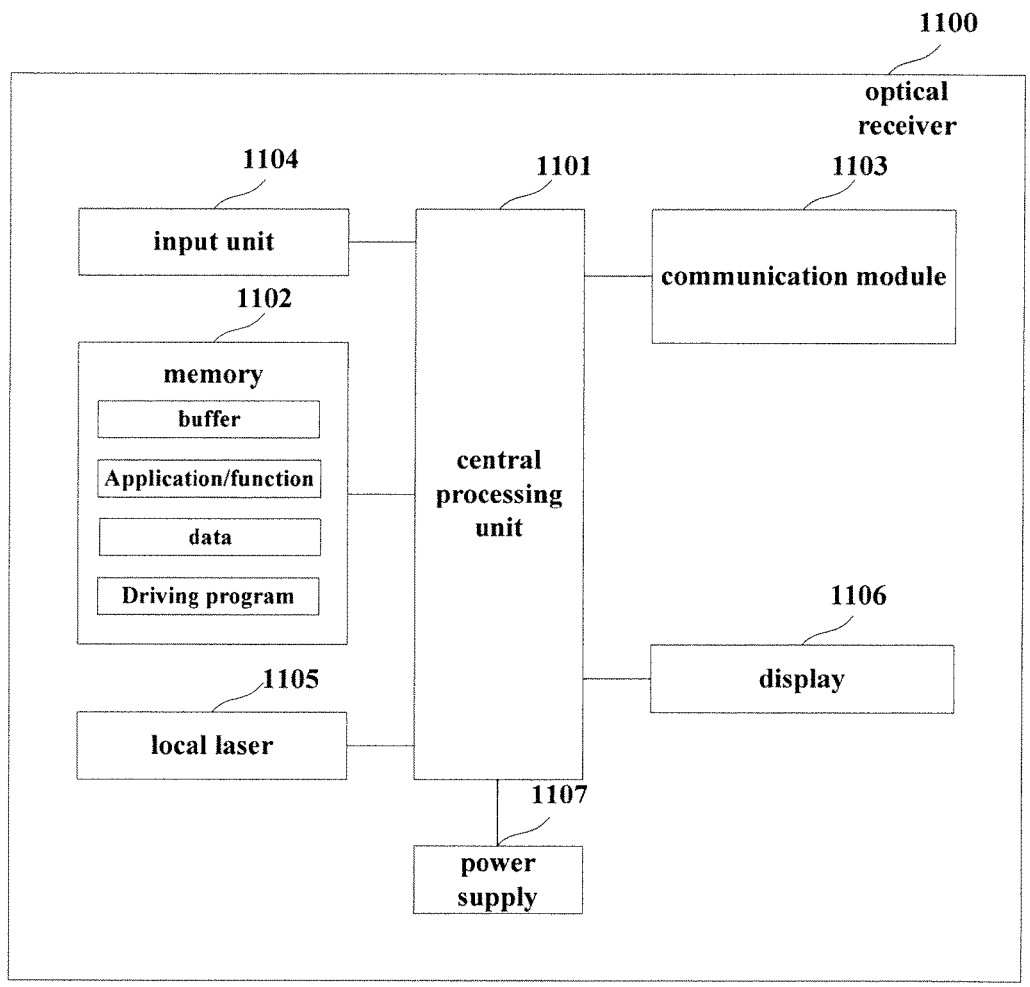
FIG. 11 is a schematic diagram of a hardware structure of the optical receiver of an embodiment of the present disclosure.

FIG. 11 is a schematic diagram of a structure of the optical receiver of this embodiment. As shown in FIG. 11, the optical receiver 1100 may include a central processing unit (CPU) 1101 and a memory 1102, the memory 1102 being coupled to the central processing unit 1101. It should be noted that this figure is illustrative only, and other types of structures may also be used, so as to supplement or replace this structure and achieve telecommunications function or other functions.

In an implementation, the functions of the apparatus for detecting channel spacing described in Embodiment 1 may be integrated into the central processing unit 1101.

In another implementation, the apparatus for detecting channel spacing and the central processing unit 1101 may be configured separately. For example, the apparatus for detecting channel spacing may be configured as a chip connected to the central processing unit 1101, with its functions being realized under control of the central processing unit 1101.

As shown in FIG. 11, the optical receiver 1100 may further include a communication module 1103, an input unit 1104, a local laser 1105, a display 1106 and a power supply 1107. It should be noted that the optical receiver 1100 does not necessarily include all the parts shown in FIG. 11. And furthermore, the optical receiver 1100 may include components not shown in FIG. 11, and the related art may be referred to.

As shown in FIG. 11, the central processing unit 1101 is sometimes referred to as a controller or control, and may include a microprocessor or other processor devices and/or logic devices. The central processing unit 1101 receives input and controls operations of every components of the optical receiver 1100.

In this embodiment, the memory 1102 may be, for example, one or more of a buffer memory, a flash memory, a hard drive, a mobile medium, a volatile memory, a nonvolatile memory, or other suitable devices, which may store predefined or preconfigured information. Furthermore, it may store programs executing related information. And the central processing unit 1101 may execute the programs stored in the memory 1102, so as to realize configuration information and reconfiguration information storage, etc. Functions of other parts are similar to those of the related art, which shall not be described herein any further. The parts of the optical receiver 1100 may be realized by specific hardware, firmware, software, or any combination thereof, without departing from the scope of the present disclosure.

The optical receiver of the embodiment of the present disclosure may ensure estimation accuracy of channel spacing, and reduce influence of non-ideal factors on estimation value.

Embodiment 4

Figure 12:
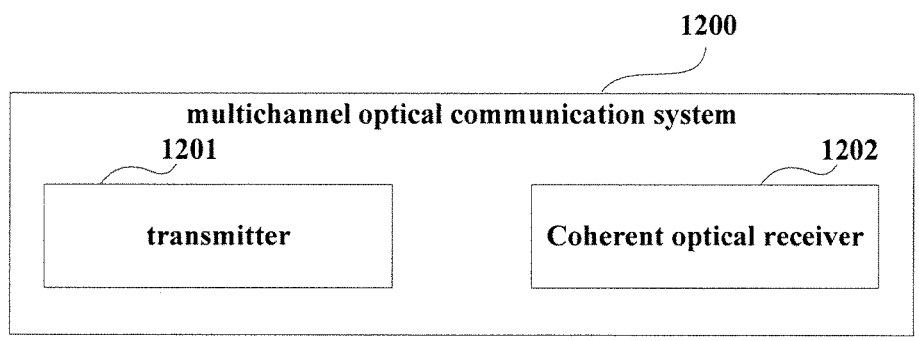
FIG. 12 is a schematic diagram of a structure of the multichannel optical communications system of an embodiment of the present disclosure.

An embodiment of the present disclosure provides a multichannel optical communications system. FIG. 12 is a schematic diagram of a structure of the system. As shown in FIG. 12, the system 1200 includes a transmitter 1201 and an optical receiver 1202. In this embodiment, the optical receiver 1202 may be realized by the optical receiver described in Embodiment 3, the contents of which being incorporated herein, and being not going to be described herein any further.

With the multichannel optical communications system provided by the embodiment of the present disclosure, estimation accuracy of channel spacing may be ensured, and influence of non-ideal factors on estimation value may be reduced.

An embodiment of the present disclosure provides a computer-readable program, wherein when the program is executed in an apparatus for detecting channel spacing or an optical receiver, the program enables the apparatus or the optical receiver to carry out the method for detecting channel spacing as described in Embodiment 2.

An embodiment of the present disclosure further provides a storage medium in which a computer-readable program is stored, wherein the computer-readable program enables an apparatus for detecting channel spacing or an optical receiver to carry out the method for detecting channel spacing as described in Embodiment 2.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

The invention claimed is:

1. An apparatus for detecting channel spacing, comprising:
    a memory that stores a plurality of instructions; and
    a processor coupled to the memory and configured to execute the instructions to:
        estimate a frequency offset of a center channel according to a received signal;
        estimate a frequency offset of a neighboring channel according to the received signal; and
        determine channel spacing according to the frequency offset of the center channel estimated by the first estimating unit and the frequency offset of the neighboring channel estimated by the second estimating unit.

2. The apparatus according to claim 1, wherein the processor further executes the instructions to:
    preprocess the received signal, and
    estimating unit estimate the frequency offset of the center channel and the frequency offset of the neighboring channel according to the preprocessed received signal.

3. The apparatus according to claim 1, wherein the apparatus further comprises:
    a filter configured to filter the received signal, and
    the processor further executes the instructions to: estimate the frequency offset of the center channel and the frequency offset of the neighboring channel according to the filtered received signal.

4. The apparatus according to claim 3, wherein the filter:
    configured to set a filter bandwidth of the center channel, filter the received signal according to the filter bandwidth of the center channel, and provide the filtered signal to the processor; and
    configured to set filter bandwidth of the neighboring channel, filter the received signal according to the filter bandwidth of the neighboring channel, and provide the filtered signal to the processor.

5. The apparatus according to claim 4, wherein the filter bandwidth of the neighboring channel is set to ensure that information on the neighboring channel is maintained and information on the center channel is removed in a case where the channel spacing or the frequency offset of the neighboring channel or the frequency offset of the center channel change.

6. The apparatus according to claim 1, wherein the apparatus further comprises:
    a synchronizer configured to perform synchronization operations on the received signal, and
    the processor further executes the instructions to: estimate the frequency offset of the center channel and the frequency offset of the neighboring channel according to the synchronized received signal.

7. The apparatus according to claim 6, wherein the synchronizer further:
configured to perform a first synchronization operation on the received signal, where the processor estimates the frequency offset of the center channel according to the synchronized received signal; and
configured to perform a second synchronization operation on the received signal, where the processor estimates the frequency offset of the neighboring channel according to the synchronized received signal.

8. The apparatus according to claim 1, wherein the processor further executes the instructions to: estimate the frequency offset of the center channel and/or the frequency offset of the neighboring channel according to the following formula:

$$\Delta f = \mathrm{angle}(<S_n \cdot S_{n+k}^*>)/2\pi k T_s;$$

where, $S_n$ is complex information on an n-th sampling point, $S_{n+k}^*$ is complex conjugate information on an (n+k)-th sampling point, and $T_s$ is a sampling period, n, k and n+k are integers which are less than the number of sampling points.

9. The apparatus according to claim 1, wherein the processor further executes the instructions to: estimate the frequency offset of the center channel and/or the frequency offset of the neighboring channel according to the following formula:

$$\Delta f = \mathrm{angle}(<S_n \cdot S_{n+N}^*>)/2\pi N T_s, \Delta f = \mathrm{angle}(<S_n \cdot S_{n+k}^*>)/2\pi k T_s;$$

where, $S_n$ is complex information on a periodic signal or an n-th symbol of a training sequence, $S_{n+N}^*$ is complex conjugate information on an (n+N)-th symbol, $T_s$ is a symbol period, and N is the number of symbols of each period, n is an integer which is less than the number of symbols.

10. A method for detecting channel spacing, comprising:
estimating a frequency offset of a center channel according to a received signal;
estimating frequency offset of a neighboring channel according to the received signal; and
determining channel spacing according to the estimated frequency offset of the center channel and the estimated frequency offset of the neighboring channel.

* * * * *